United States Patent
Kalluri et al.

(10) Patent No.: US 10,579,735 B2
(45) Date of Patent: Mar. 3, 2020

(54) METHOD AND DEVICE FOR ADJUSTING AND IMPLEMENTING TOPIC DETECTION PROCESSES

(71) Applicant: AT&T INTELLECTUAL PROPERTY I, L.P., Atlanta, GA (US)

(72) Inventors: Sudhakar Kalluri, Cupertino, CA (US); Maisam Shahid Wasti, Palo Alto, CA (US)

(73) Assignee: AT&T INTELLECTUAL PROPERTY I, L.P., Atlanta, GA (US)

(*) Notice: Subject to any disclaimer, the term of this patent is extended or adjusted under 35 U.S.C. 154(b) by 324 days.

(21) Appl. No.: 15/615,908

(22) Filed: Jun. 7, 2017

(65) Prior Publication Data

US 2018/0357218 A1    Dec. 13, 2018

(51) Int. Cl.
*G06F 16/00* (2019.01)
*G06F 17/27* (2006.01)
*G06N 20/00* (2019.01)
*G06K 9/00* (2006.01)
*G06F 16/35* (2019.01)

(52) U.S. Cl.
CPC .......... *G06F 17/2785* (2013.01); *G06F 16/35* (2019.01); *G06F 16/355* (2019.01); *G06F 17/277* (2013.01); *G06F 17/2795* (2013.01); *G06K 9/00469* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 7,783,622 B1 * | 8/2010 | Vandermolen | G06F 3/0481 707/708 |
| 8,234,289 B2 | 7/2012 | Abernethy, Jr. et al. | |
| 8,533,195 B2 | 9/2013 | Xu et al. | |
| 8,533,208 B2 | 9/2013 | Sundaresan et al. | |
| 8,539,359 B2 | 9/2013 | Rapaport et al. | |
| 8,626,509 B2 | 1/2014 | Roy et al. | |
| 8,880,406 B2 | 11/2014 | Rana et al. | |
| 9,032,289 B1 * | 5/2015 | Cierniak | G06F 16/9558 715/255 |
| 9,111,218 B1 * | 8/2015 | Lewis | G06N 5/04 |
| 9,600,828 B2 | 3/2017 | Srivastava et al. | |

(Continued)

OTHER PUBLICATIONS

"Customer Listening and Machine Learning An Artificial Intelligence Approach", http://www.kana.com/enterprise-whitepaper/customer-listening-and-machine-learning-white-paper-en-us.pdf; 2014, 1-8.

(Continued)

*Primary Examiner* — Bai D Vu
(74) *Attorney, Agent, or Firm* — Guntin & Gust, PLC; John G. Rauch

(57) ABSTRACT

Aspects of the subject disclosure may include, for example, applying a topic detection process to documents to obtain automatically detected topics and groups of automatically detected words, comparing the automatically detected topics with manually determined topics to determine actual purity metrics, determining an error metric based on a measure of deviation between ideal purity metrics and the actual purity metrics, and adjusting a parameter of the topic detection process according to the error metric resulting in an adjusted topic detection process. Other embodiments are disclosed.

20 Claims, 8 Drawing Sheets

(56) References Cited

U.S. PATENT DOCUMENTS

| | | | |
|---|---|---|---|
| 2012/0130771 A1 | 5/2012 | Kannan et al. | |
| 2012/0290950 A1* | 11/2012 | Rapaport | H04L 51/32 715/753 |
| 2013/0273976 A1 | 10/2013 | Rao et al. | |
| 2014/0280639 A1 | 9/2014 | Bentwood et al. | |
| 2014/0297765 A1 | 10/2014 | Beckley et al. | |
| 2014/0324982 A1 | 10/2014 | Agrawal et al. | |
| 2015/0081802 A1* | 3/2015 | Borenstein | H04L 51/04 709/206 |
| 2015/0324065 A1 | 11/2015 | Kaul et al. | |
| 2016/0196292 A1* | 7/2016 | Munakata | G06F 16/35 707/738 |
| 2018/0114136 A1* | 4/2018 | Kumar | G06N 7/005 |

OTHER PUBLICATIONS

Allan, "Topic Detection and Tracking Pilot Study Final Report", Proceedings of the DARPA Broadcast News Transcription and Understanding Workshop, Feb. 1998., 1-25.

Boulis, "Topic Learning in Text and Conversational Speech", https://ssli.ee.washington.edu/papers/grad/theses/boulis-PhD.pdf; 1-162, 2005.

Goebel, "How we Built Edward, an Artificially Intelligent, SMS Virtual Host for Radisson Blu Edwardian", (http://blogs.aspect.com/how-we-built-edward-an-artilicially-intelligent-sms-virtual-host-for-radisson-blu-edwardian/); Apr. 7, 2016, 1-4.

Jesus, "Introduction to Topic Models", https://blog.bigml.com/2016/11/16/introduction-to-topic-models; Nov. 16, 2016, 1-4.

Ostendorf, "Workshop on Semi-Supervised Learning for Language Processing", http://ssli.ee.washington.edu/WS07/workshop07.html, 2007, 1-10.

Ramachandran, "Untangling Topic Threads in Chat-Based Communication: A Case Study", Analyzing Microtext: Papers from the 2011 AAAI Workshop (WS-11-05), 2011, 50-55.

Saud, "Online topic detection, tracking, and significance ranking using generative topic models", Dissertations & Theses—Gradworks, George Mason University, 2009, 3367057, Abstract only, 1-2.

Zhu, "Semi-Supervised Learning", http://www.kdd.org/kdd2016/topics/view/semi-supervised-learning, 2016, 1-2.

* cited by examiner

100

METHOD AND DEVICE FOR ADJUSTING AND IMPLEMENTING TOPIC DETECTION PROCESSES

FIELD OF THE DISCLOSURE

The subject disclosure relates to a method and device for adjusting and implementing topic detection processes

BACKGROUND

Characterization of data can be an important tool because it allows for a better understanding of the data and can further enable adjustments or improvements, such as to a system associated with the data. The characterization of data can be a time-consuming and resource-intensive process.

BRIEF DESCRIPTION OF THE DRAWINGS

Reference will now be made to the accompanying drawings, which are not necessarily drawn to scale, and wherein.

DETAILED DESCRIPTION

Figure 1:
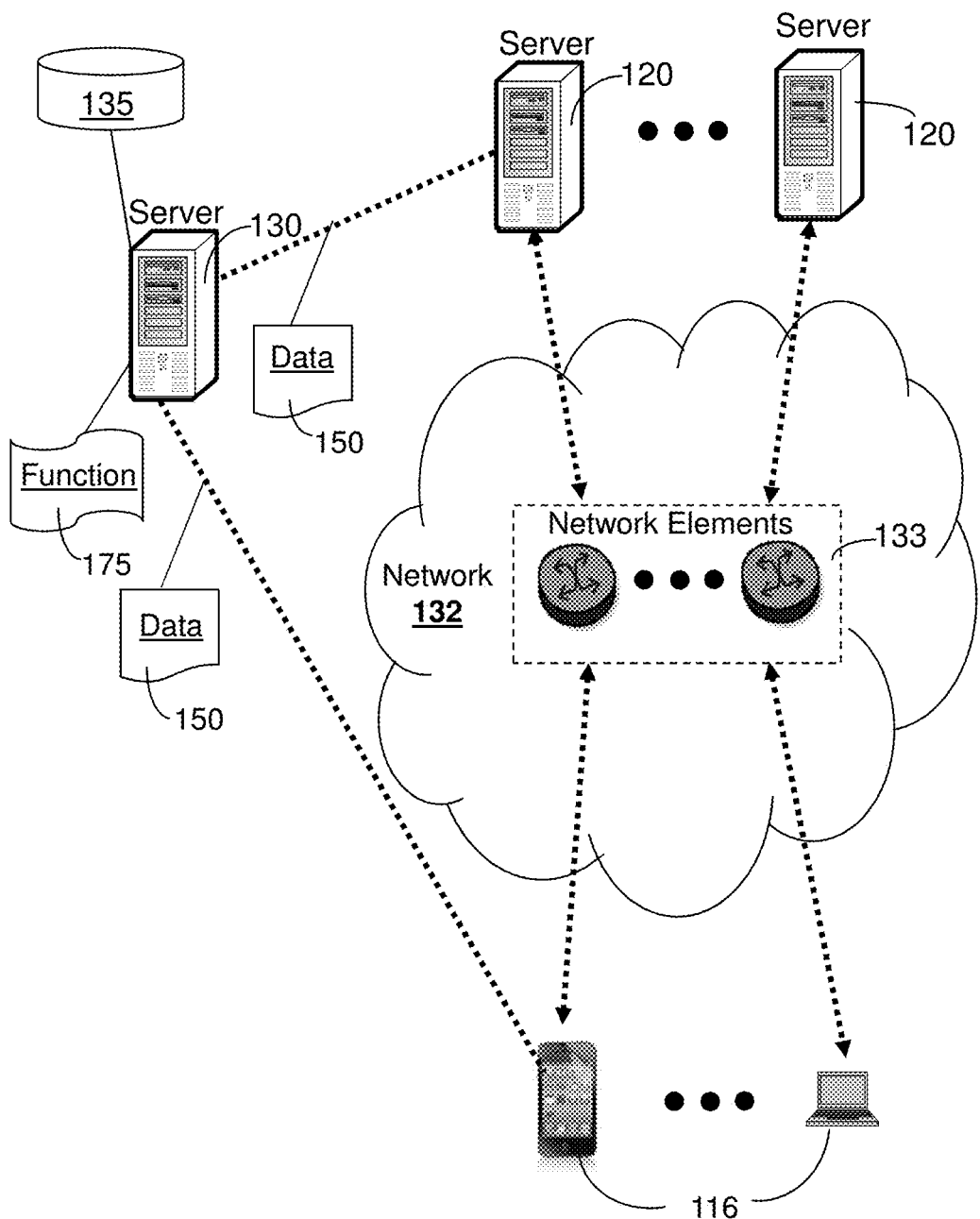
FIG. 1 depicts an illustrative embodiment of a system for performing topic detection of data and for adjusting a topic detection process.

The subject disclosure describes, among other things, illustrative embodiments for applying topic detection to data and adjusting or optimizing the particular topic detection process or algorithm. In one or more embodiments, an iteratively optimized (or adjusted) unsupervised topic detection methodology is implemented with respect to data, which is aided by manual labeling of a subset (e.g., a small subset) of the data with domain-specific topics and their associated word lists. In one or more embodiments, the methodology can be agnostic (or readily adaptable) to a particular topic detection technique employed. In one or more embodiments, the methodology to iteratively optimize or adjust the particular topic detection component of an overall system can be to update or otherwise tune topic detection parameters for a next iteration of the particular topic detection technique, such as by using a metric of purity or mutual-exclusivity of topics generated by a current iteration of the topic detection technique. Other embodiments are described in the subject disclosure.

One or more aspects of the subject disclosure can be a method that includes applying, by a processing system including a processor, a topic detection process to documents to obtain automatically detected topics and groups of automatically detected words that each correspond to one of the automatically detected topics, where the automatically detected topics are characterized by probability distributions over a set of words associated with the documents, and where each of the automatically detected words is in at least one of the documents. The method can include obtaining, by the processing system, manually determined topics and groups of manually determined words that each correspond to one of the manually determined topics, where the manually determined topics and the groups of manually determined words are derived from a manual analysis of a subset of the documents, where each of the manually determined topics characterizes at least one of the subset of the documents, and where each of the manually determined words is in at least one of the subset of the documents. The method can include comparing, by the processing system, each of the automatically detected topics with all of the manually determined topics according to similarities between a corresponding one of the groups of automatically detected words and a corresponding one of the groups of manually determined words to determine actual purity metrics. The method can include determining, by the processing system, an error metric based on a measure of deviation between ideal purity metrics and the actual purity metrics, where the ideal purity metrics are based on a determination as to whether an automatically detected topic is a new topic as compared to the manually determined topics. The method can include adjusting, by the processing system, a parameter of the topic detection process according to the error metric resulting in an adjusted topic detection process. The method can include applying, by the processing system, the adjusted topic detection process to the documents to obtain adjusted automatically detected topics and groups of adjusted automatically detected words that each correspond to one of the adjusted automatically detected topics.

One or more aspects of the subject disclosure can be a device including a processing system having a processor, and a memory that stores executable instructions that, when executed by the processing system, facilitate performance of operations. The operations can include applying a topic detection process to documents to obtain automatically detected topics and groups of automatically detected words that each correspond to one of the automatically detected topics, where the automatically detected topics are characterized by probability distributions over a set of words associated with the documents, and where each of the automatically detected words is in at least one of the documents. The operations can include comparing each of the automatically detected topics with manually determined topics according to similarities between a corresponding one of the groups of automatically detected words and a corresponding one of groups of manually determined words for all of the manually determined topics to determine actual purity metrics, where the manually determined topics and the groups of manually determined words are derived from a manual analysis of a subset of the documents, wherein each of the manually determined topics characterizes at least one of the subset of the documents, and where each of the manually determined words is in at least one of the subset of the documents. The operations can include determining an error metric based on a measure of deviation between ideal purity metrics and the actual purity metrics. The operations can include adjusting a parameter of the topic detection process according to the error metric resulting in an adjusted topic detection process.

One or more aspects of the subject disclosure can be a machine-readable storage medium, comprising executable instructions that, when executed by a processing system including a processor, facilitate performance of operations. The operations can include applying a topic detection process to documents to obtain automatically detected topics and groups of automatically detected words that each correspond to one of the automatically detected topics, where the automatically detected topics are characterized by probability distributions over a set of words associated with the documents. The operations can include compare each of the automatically detected topics with manually determined topics according to similarities associated with the groups of automatically detected words and groups of manually determined words of the manually determined topics to determine actual purity metrics, wherein the manually determined topics and the groups of manually determined words are derived from a manual analysis of a subset of the documents. The operations can include determining an error metric based on a measure of deviation between ideal purity metrics and the actual purity metrics. The operations can include adjusting a parameter of the topic detection process according to the error metric resulting in an adjusted topic detection process.

FIG. 1 depicts an illustrative embodiment of a system 100 that allows automated topic detection, where the topic detection technique can be optimized or adjusted iteratively to provide for a more accurate classification or categorization of data based on the detected topics. In one or more embodiments, system 100 can utilize iterative optimization of unsupervised topic-detection (while being agnostic to a particular topic-detection technique employed), using a domain-specific seed of manually-generated topics to measure the non-ideality of each topic-detection iteration's output, and updating (e.g., continuously) hyper-parameters of the topic-detection algorithm in order to approach mutual-exclusivity or purity of the topic-detection-generated topics. In one or more embodiments, system 100 can employ an error metric generated per topic-detection iteration, and can further employ this error metric in teaching the topic-detection algorithm to generate mutually exclusive topics in an automated fashion.

System 100 can analyze various types of data. The data, which is referred to as documents herein, can be in various forms, including electronic records that utilize various formats. The documents can be from various sources, including end user devices, network devices, customer premises equipment, servers interfacing with end user devices, and so forth. As an example, the documents can be transcripts of customer service communications associated with users, such as voice calls or messaging sessions between users and customer service representatives (or customer service equipment including interactive voice response systems). As another example, the documents can be text posts or other information provided by users in a social computer network. In one embodiment, the documents can include any type of information that is subject to analysis and categorization or characterization based on topics.

System 100 enables implementing a topic detection technique(s), which can be iteratively adjusted to improve accuracy and/or efficiency, for data 150 that is sourced from customer premises equipment, such as computing devices 116, and/or sourced from network equipment, such as servers 120. The customer premises equipment, including computing device 116 can be associated with different individuals and entities at different locations. The computing devices 116 can includes various types of end user devices, such as mobile phones, desktop computers, set top boxes, gaming consoles, personal digital assistants. The computing devices 116 can be other types of communication devices that generate communications which can be analyzed and characterized, including communications with or without human intervention, such as IoT devices (e.g., a smart utility meter that reports metrics to a utility company server. In one embodiment, the computing devices 116 can be associated with different users at different locations, including fixed locations (e.g., a desktop computer at a premises) and in transit (e.g., a vehicle communication system with wireless access).

In one embodiment, communication services can be provided to the computing devices 116 by way of a network 132, which can utilize various components (e.g., network elements 133), technologies, protocols and so forth. The network 132 can be a wired network, a wireless network or a combination thereof, and can operate according to various communication protocols and radio access technologies, including 3G, 4G and/or 5G. The network 132 can provide communication services (e.g., voice video, data and/or messaging) to various end user devices including mobile and/or fixed communication devices.

System 100 can include one or more servers 130 (only one of which is shown) that can perform or otherwise facilitate the performance of topic detection among data that is being generated via the network 132. As an example, the server 130 can perform a function 175 that iteratively optimizes or adjusts an unsupervised topic detection methodology that is employed to analyze the data. The adjustment of the topic detection technique and the implementation of the topic detection technique can be performed at the same server 130 or at different servers, such as having dedicated servers that perform particular tasks of the adjustment and implementation as will be described herein.

In one or more embodiments, function 175 of the server 130 can iteratively update or otherwise tune a topic detection parameter(s) for a next iteration of a selected topic detection technique, using a metric of purity or mutual-exclusivity of topics generated during a current iteration of the topic detection technique. As explained herein, the updating or tuning of the parameter can be facilitated via manual labeling of a small subset of the data with domain-specific topics and their associated word lists. In one embodiment, the iterative optimization can proceed until a stopping criterion is satisfied. The topics and words can be stored in a database 135.

In one embodiment, function 175 can be based in part on obtaining a manual examination which is limited to a sample or subset of the data 150, resulting in a set of manually determined topics along with their associated words. In one embodiment, the manual examination and determination of topics can be subjective to the person(s) examining the document and that person(s) can identify particular words from the document that support the manually determined topic. In this example, an automated topic detection technique can be selected, such as latent dirichlet allocation, and applied to the data, during which a number of topic-detection parameters, (e.g., a number of topics) can be adjusted or optimized.

For each iteration, the automated topic detection technique can detect a set of automatically detected topics with their associated words. Function 175 of the server 130 enables these automatically detected topics to be compared with the manually generated topics and further enables a measure of purity or mutual exclusivity to be computed from the comparison, which represents actual purity metrics for each of the automatically detected topics. An error metric can be derived from the measure of purity or mutual exclusivity which forms the basis for tuning or adjusting parameter(s) of the tuning detection technique. As an example, the error metric can be based on a comparison of the actual purity metrics for each of the automatically detected topics with ideal purity metrics for the automatically detected topics.

Figure 2:
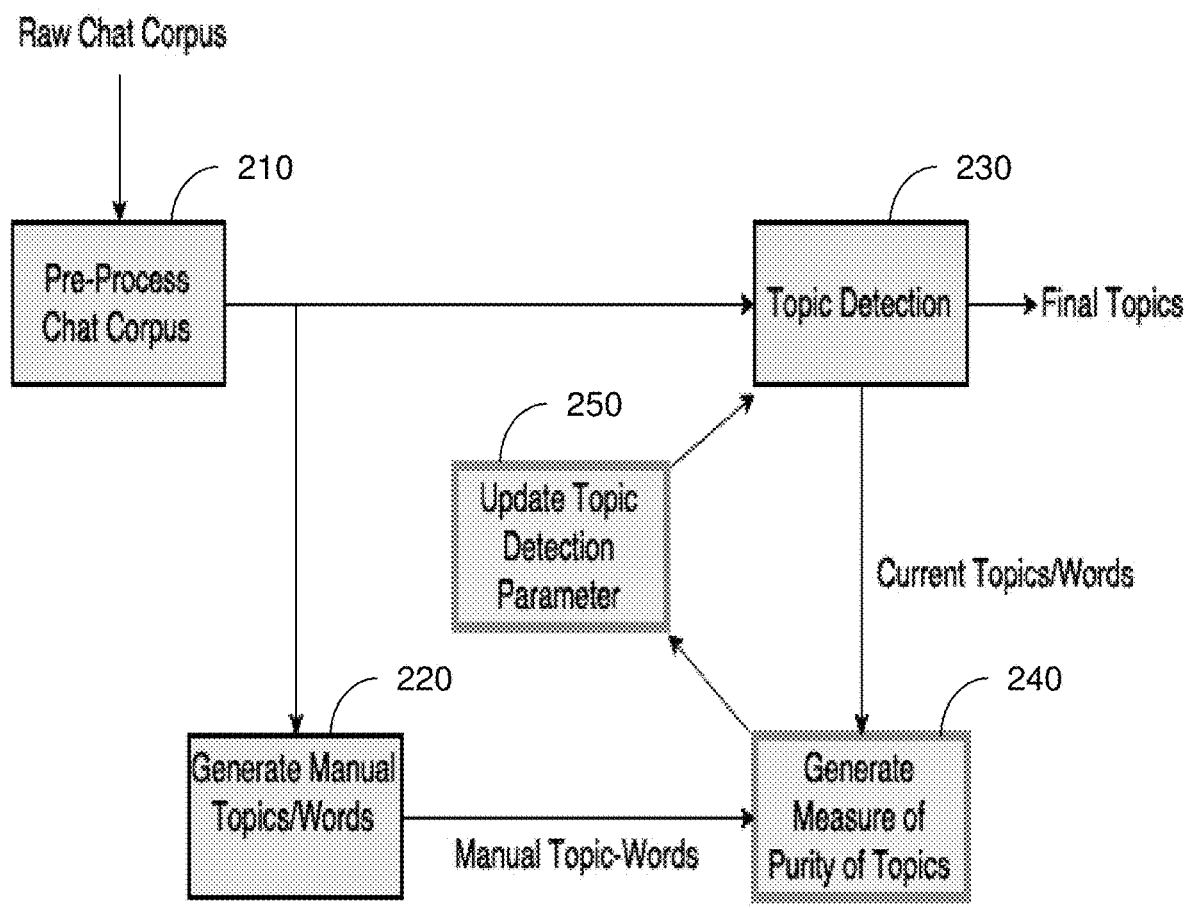
FIG. 2 depicts an illustrative embodiment of a flowchart associated with the system of FIG. 1.

FIG. 2 depicts an illustrative embodiment of a flow chart 200 that can be implemented by system 100. In this embodiment, a text "corpus" can be a collection of documents with a similar theme (e.g., customer service chat transcripts with each transcript being a document, social network posts within a particular social network grouping with each post or with each string of posts being a document, and so forth). In one embodiment, each document can include a set of words that are drawn from a corpus-specific vocabulary of V words indexed as $\{1, 2, \ldots, V\}$. In one embodiment, each document can be characterized by a mixture of "topics." In one embodiment, a topic can be characterized by a probability distribution over the vocabulary words $\{1, 2, \ldots, V\}$. As an extreme example, a topic described by Probability $\{word\ 1\}=1$ and Probability $\{word\ i\}=0$ for $i=2, 3, \ldots, V$. In one embodiment, each document word can be a sample drawn from a particular topic (e.g., from a particular vocabulary-word distribution). The topic detection can include identifying a set of topics characterizing a given document (e.g., a given customer chat about a web-based product might be about two issues or topics, such as "unable-to-login" and "product-feature-bug.")

The following example will be described with respect to chat transcripts, but could be applied to other data. At 210, pre-processing can be applied to raw chat corpus (e.g., the documents). Various pre-processing can be utilized to filter undesired information such as removal of one or more of: HTML tags, email addresses, common and irrelevant English words, and so forth. The pre-processing can be applied to filter the documents so that one or more other steps of method 200 perform more efficiently, such as removing words that are predicted or known not to be part of any potential topic. At 220, a manual process of examining a sample of chat transcripts is performed, resulting in a set of topics along with their associated words, which are illustrated as "manual topic-words." For example, the manual examination can be a subjective analysis by one or more persons to identify a number of topics and each of the words from the subset of chat transcripts that support that manually determined topic. At 230, an iteration of the automated topic detection technique can be performed, resulting in a set of automatically detected topics along with their associated words, which are illustrated in FIG. 2 as "current topics/words."

At 240, these automatically detected topics can be compared with the manually generated topics and a measure of purity or mutual exclusivity of the automatically detected topics is computed. Ideally, one would desire that each of the automatically detected word lists represents a unique underlying topic, hence the notion of purity or mutual exclusivity. In this example, it is assumed that the manually determined topics are in fact mutually exclusive. Also, a subset of the automatically detected topics of this current iteration may: (a) correspond to a subset of the manually determined topics, or (b) be entirely new topics discovered by the unsupervised topic-detection algorithm and not encountered by the manual topic-determination process. An error-metric can be determined which is described with respect to FIG. 4. The error-metric can be the basis for tuning (e.g., via a stochastic gradient descent optimization) of the parameters of the next iteration of the topic-detection as depicted at 250. Method 200 can continue through a number of iterations until a stopping criterion is satisfied. The criterion can be a number of different factors, including a number of iterations, size of data, available resources, subject matter of data, and so forth.

Figure 3:
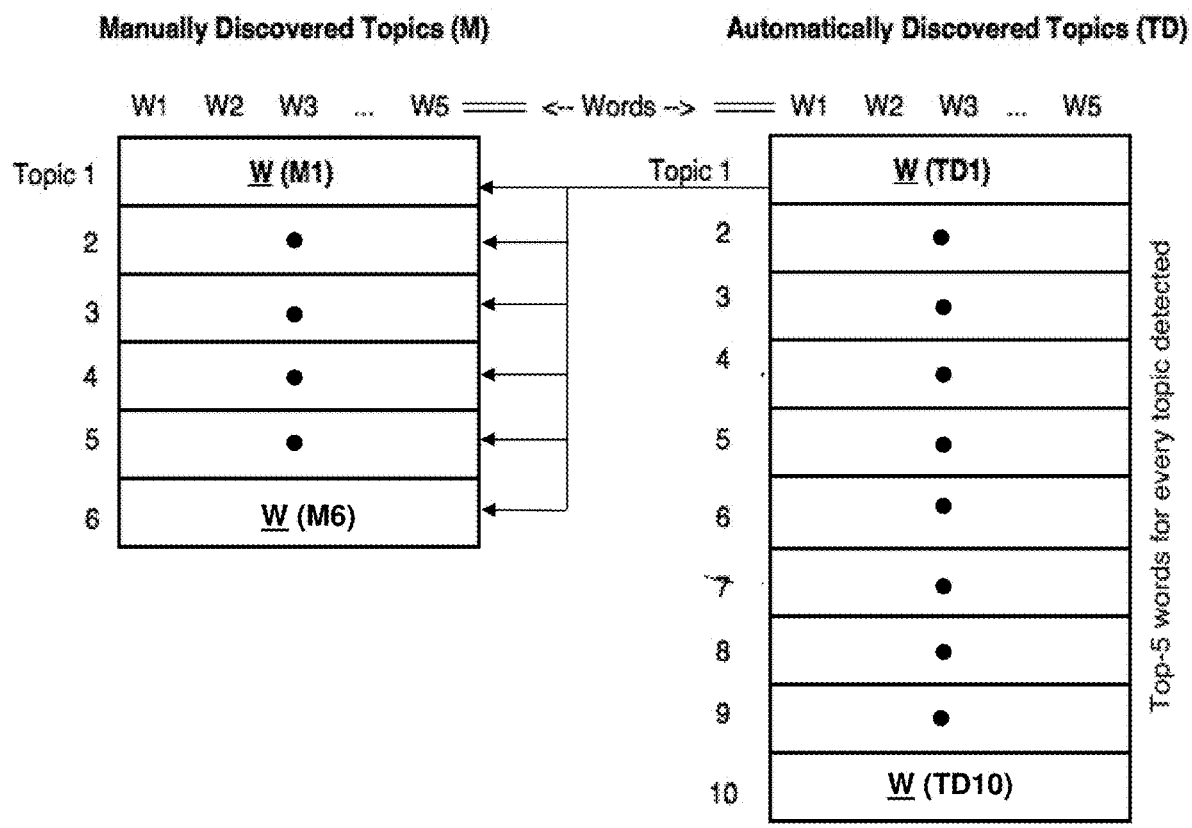
FIG. 3 depicts an illustrative embodiment of schematic diagram illustrating a comparison of similarities between manually determined words for manually determined topics and automatically detected words for automatically detected topics that are derived from the system of FIG. 1 and the flowchart of FIG. 2.

FIG. 3 in conjunction with Equation (1) can be utilized to implement and explain the topic-purity metric:

$$\rightarrow \text{Metric}(TD1) = \text{Max}\{\text{Similarity}(TD1, M_i), \text{ where } i=1,\ldots,6\} - \text{SecondMax}\{\text{Similarity}(TD1, M_j), \text{ where } j=1,\ldots,6\} \quad (1)$$

Figure 4:
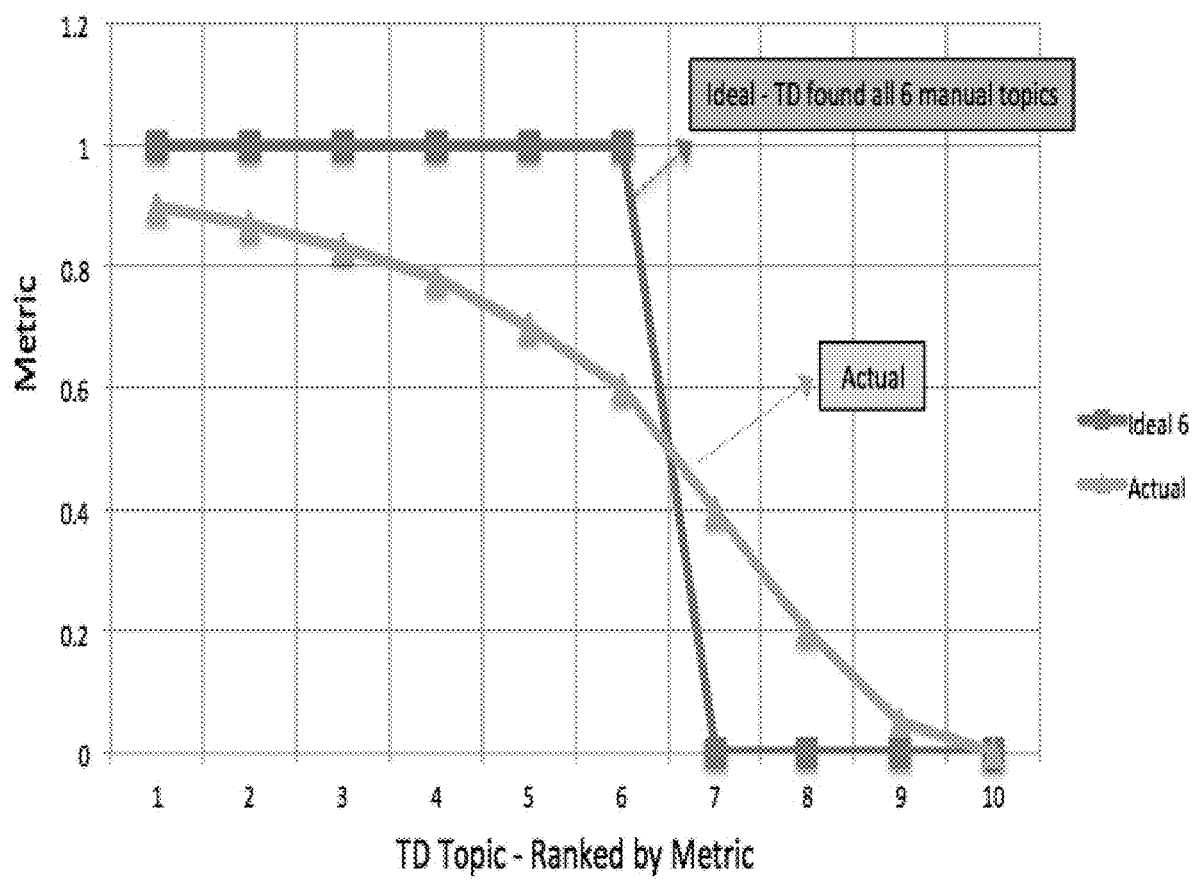
FIG. 4 depicts an illustrative embodiment of a graph of actual and ideal purity metrics associated with automatically detected topics and automatically detected words that are derived from the system of FIG. 1 and the flowchart of FIG. 2.

FIG. 4 and Equation (2) illustrate precursor graphs to an error metric characterizing the deviation of the topic-detection topics from a notion of ideality.

$$\rightarrow \text{Plot}\{\text{Metric}(TD_j), \text{ where } j=1,\ldots,10\} \text{ in decreasing order} \quad (2)$$

Assume for our example that all topics, whether generated manually ("M") or by topic-detection ("TD") are described by a particular number of words per topic, such as five. Further assume that there are six manually generated topics illustrated in FIG. 3 as M1-M6 and the current topic-detection iteration generated ten topics illustrated in FIG. 3 as TD1-TD10. For each TD topic, its corresponding five-word list can be utilized to compute a similarity between the TD topic and each of the six manually generated topics M1-M6. According to Equation (1), the difference between the largest and second largest of these similarities is defined as the purity metric for that TD topic. This process can be repeated for all of the TD topics. Continuing with this example, and having computed the purity metric for all ten TD topics, these purity metrics can be plotted in decreasing order as shown in FIG. 4 as an "Actual" line for the current iteration. The "Ideal" line has a purity metric equal to 1.0 when a TD topic matched (or may match if the TD algorithm is optimized) a manually generated topic and equal to 0.0 when the TD topic was entirely new. For instance, since there are six manually generated topics, ideally the TD algorithm could find all six and thus six of the ideal purity metrics are set to 1.0 while the remaining four ideal purity metrics are set to 0.0 as "new" topics (for a set of ten TD topics generated by the topic detection algorithm in this iteration).

In this example, a measure of deviation of the "Actual" line from the "Ideal" line can be used to determine an error metric, such as a mean absolute-deviation in purity-metric across the ten topics. This measure of deviation can constitute the error metric of the current topic-detection iteration and this is what can drive the update or adjustment of the topic-detection hyper-parameters (and can also be used in an algorithm-stopping criterion) for the next topic-detection iteration.

In one or more embodiments, the measure of deviation can be a mean squared deviation in purity metric or another error measure. In one or more embodiments, other metrics (e.g., the similarity measure in Equation (1)) can also be modified. In another example, if one considers a scenario (e.g. due to disparities between the sample used for manual topic-discovery and that used by the topic-detection algorithm) where the topic-detection algorithm is expected to at best match only 4 of the 6 manually-generated topics, then the "Ideal" line in FIG. 4 would show an ideal purity metric equal to 1.0 for the first 4 points in the graph and 0.0 for the rest of the ideal purity metrics.

Figure 5:
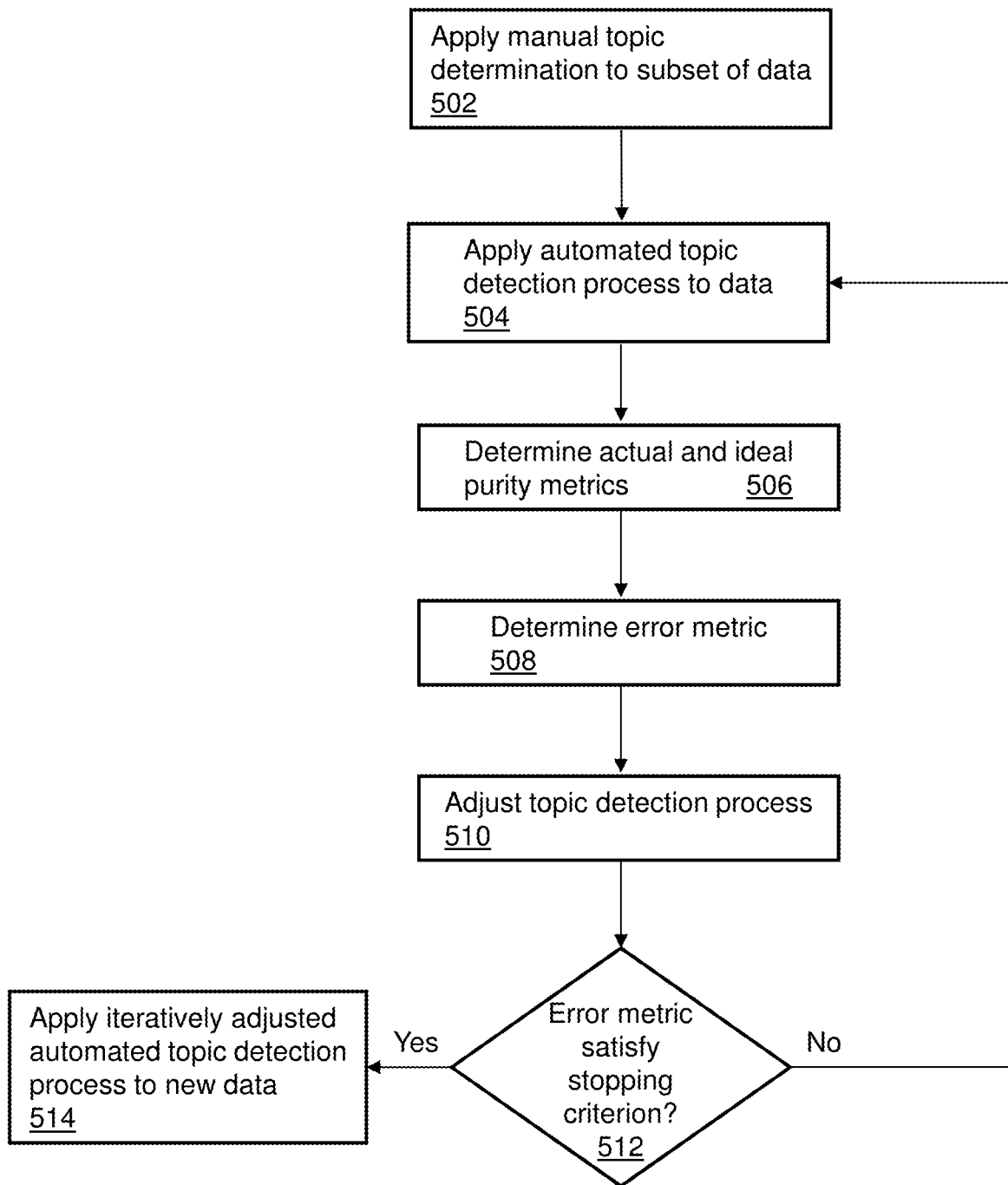
FIG. 5 depicts an illustrative embodiment of a method used in portions of the system described in FIG. 1 for performing topic detection of data and for adjusting a topic detection process.

FIG. 5 depicts an illustrative embodiment of a method 500 that can be used by system 100 to iteratively adjust or optimize an automated topic detection process, which can be an unsupervised topic detection process. Method 500 is described as being performed by a processing system, which can include any number of processors in any type of a computing environment including a centralized, a distributed, and/or a virtual environment. At 502, a processing system can obtain manually determined topics, which each have a group or list of manually determined words. In one embodiment, the manually determined topics and the groups of manually determined words can be derived or otherwise determined from a manual analysis of a subset of the documents. The number of documents in the subset (e.g., 0.1%, 1%, 5%, 10%, 20%, and so forth) can vary based on a number of factors, such as the overall size of the documents, the general theme or subject matter of the documents (e.g., customer service information, purchasing information, social media posts, and so forth), the source of the data, as well as other factors. In this example, one or more persons can review the documents in whole or in part to derive the manually determined topics and each of the groups of manually determined words that support the particular manually determined topic. For instance, the manual examination of the documents can be a subjective analysis by the person(s) as to what topic or topics characterize the document or documents. In one embodiment, one, some or all of the documents can be characterized by one or more of the manually determined topics. In one embodiment, one, some or all of the manually determined words can be found in at least one of the subset of the documents. In another embodiment, the manually determined words can be derivatives of words found in the document(s), such as having a different tense or being a synonym of the word.

At 504, the processing system can apply an automated topic detection process (or algorithm) to the documents to obtain automatically detected topics and groups of automatically detected words which each have a group or list of automatically detected words. In one embodiment, the automatically detected topics can be characterized by probability distributions over a set of words associated with the documents. In one embodiment, one, some or all of the documents can be characterized by one or more of the automatically detected topics. In one embodiment, one, some or all of the automatically detected words can be found in at least one of the documents. In another embodiment, the automatically detected words can be derivatives of words found in the document(s), such as having a different tense or being a synonym of the word. As an example, the automated topic detection process can be or otherwise can include latent dirichlet allocation, however, other embodiments can utilize other automated topic detection processes.

At 506, purity metrics can be determined for each of the automatically detected topics. In one embodiment, the determined purity metrics can include actual purity metrics and ideal purity metrics. As an example, the actual purity metrics can be determined according to a comparison of each of the automatically detected topics with all of the manually determined topics. This comparison can be based on similarities determined between a corresponding one of the groups of automatically detected words and a corresponding one of the groups of manually determined words. For instance, a word list (or characteristics of the word list) for a first automatically detected topic can be compared to each word list (or each of the characteristics of the word lists) for all of the manually determined topics. In one embodiment, this comparison of similarities can be quantified to determine a first similarity quantity by quantifying a largest similarity between the corresponding automatically detected words and corresponding manually determined words of a most similar manually determined topic. Continuing with this example, a second similarity quantity can be calculated by quantifying a second largest similarity between the corresponding automatically detected words and corresponding manually determined words of a second most similar manually determined topic. A differential between the first and second similarity quantities can then be calculated. This computation of the differential between the first and second similarity quantities can be repeated for each of the automatically detected topics (which are each compared with all of the manually determined topics).

As an example of quantifying the differential, a first automatically detected topic can be characterized by a probability distribution over the vocabulary words, where the top five words for that first automatically detected topic can be: "box powered blue screen television." Applying a direct word-to-word comparison to determine topic similarities, a most similar manually determined topic can include the words: "box powered black screen television" while a second most similar manually determined topic can include the words: "box powered no picture television." In this example which utilizes a direct word-to-word comparison, the actual purity metric for the largest similarity (i.e., comparison to the most similar manually determined topic) can be quantified as 0.8 based on an exact match for four out of five words, while the actual purity metric for the second largest similarity (i.e., comparison to the second most similar manually determined topic) can be quantified as 0.6 based on an exact match for three out of five words. The computed differential is then 0.2. It should be understood that there are various methodologies and techniques that can be implemented at 506 to compare automatically detected words (or characteristics thereof) with manually determined words (or characteristics thereof), which may or may not include the above-described example of a direct word-to-word determination of a match.

In one embodiment, ideal purity metrics can be determined for the automatically detected topics. In one embodiment, each of the ideal purity metrics is defined as either a one or a zero. For example, an ideal purity metric can be equal to 1.0 when the automatically detected topic matches (or could potentially match after optimization of the topic detection process) a manually generated topic and equals 0.0 when the TD topic was entirely new. In one embodiment, a number of the manually determined topics can be equal to a number of a first set of the ideal purity metrics that are defined as one, and a difference between the number of the manually detected topics and a number of the automatically detected topics can be equal to a number of a second set of the ideal purity metrics that are defined as zero.

At 508, the processing system can determine an error metric based on a measure of deviation between ideal purity metrics and the actual purity metrics. For example, the ideal purity metrics can be based on a determination as to whether an automatically detected topic is a new topic as compared to the manually determined topics. In one embodiment, the error metric can be a mean absolute-deviation in purity-metric across the automatically detected topics.

At 510, the processing system can adjust a parameter(s) of the topic detection process according to the error metric resulting in an adjusted topic detection process. The particular parameter(s) being adjusted can vary and can include tuning the automated topic detection process based on the error metric by applying stochastic gradient descent optimization to the topic detection process. The adjusted topic detection process can then be executed through another iteration if a stopping criterion has not been reached at 512. Otherwise, the iteratively adjusted topic detection process can be applied to other documents at 514.

In one embodiment, the processing system can filter the documents (e.g., prior to the applying the topic detection process). The filtering can remove information that is not needed or otherwise reduces the efficiency of the topic detection process, such as one or more of particular words (e.g., common words not likely to contribute to characterizing a topic), HTML tags, email addresses, and so forth.

While for purposes of simplicity of explanation, the respective processes are shown and described as a series of blocks in FIG. 5, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 6:
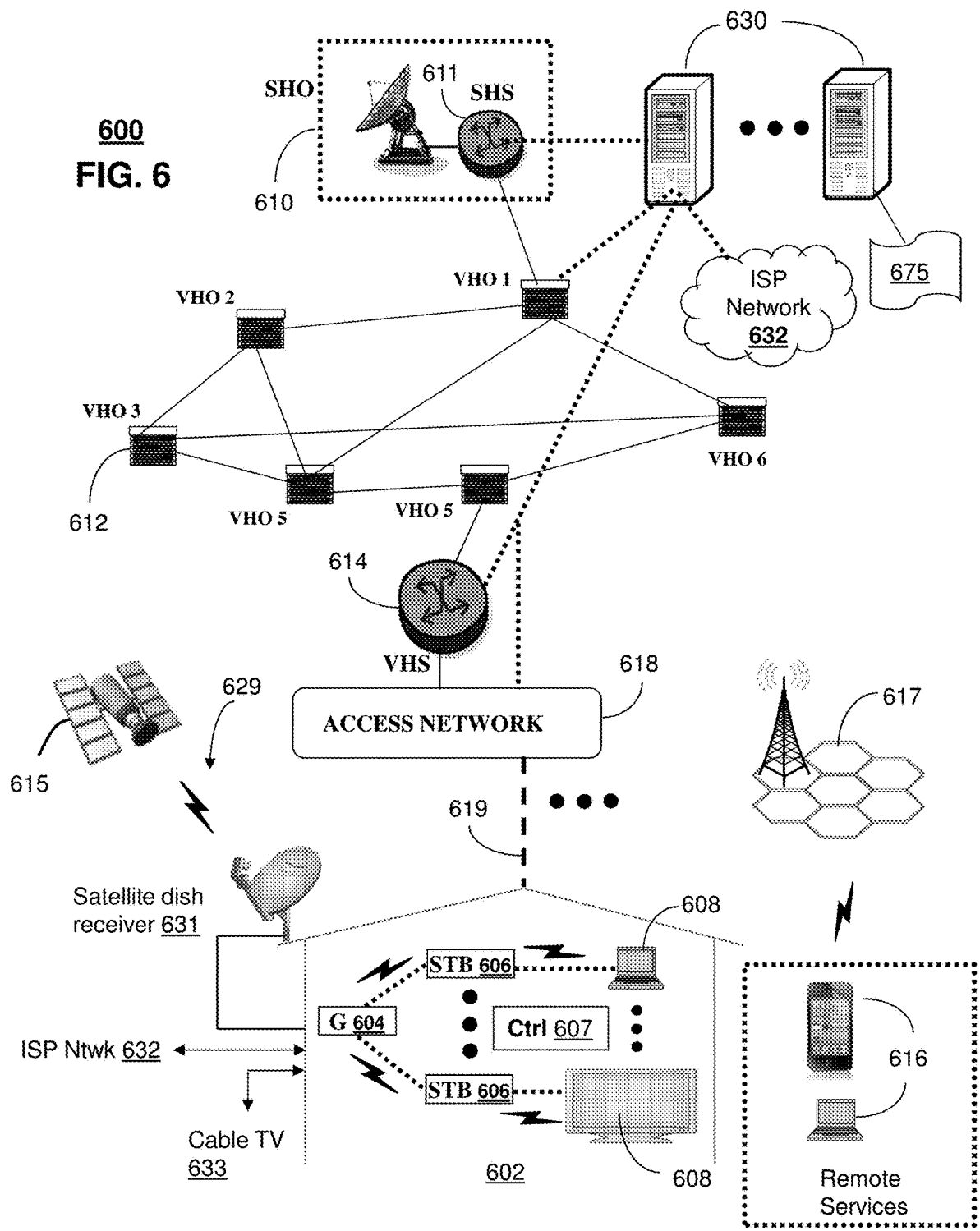
FIG. 6 depicts an illustrative embodiment of a communication system that provides communication services, topic detection of data, and adjustment of a topic detection process.

FIG. 6 depicts an illustrative embodiment of a communication system 600 for providing various communication services, such as delivering media content. The communication system 600 can represent an interactive media network, such as an interactive television system (e.g., an Internet Protocol Television (IPTV) media system). Communication system 600 can be overlaid or operably coupled with system 100 of FIG. 1 as another representative embodiment of communication system 600. In one or more embodiments, communication system 600 enables use of iterative optimization or improvement of topic detection, based on measures of non-ideality (e.g., deviation from mutual-exclusivity of topics) of each topic-detection iteration, which can be assisted by comparison with domain-specific manual generation of a seed of topics. In one embodiment, the documents or data being characterized by the topics can be associated with various aspects of the communication services of system 100, such as customer services, social network communications, product purchasing reviews, and so forth.

For instance, one or more devices illustrated in the communication system 600 of FIG. 6 can apply a topic detection process to documents to obtain automatically detected topics and corresponding groups of automatically detected words where the automatically detected topics are characterized by probability distributions over a set of words associated with the documents; compare each of the automatically detected topics with manually determined topics according to corresponding words or word characteristics where the manually determined topics and corresponding manually determined words are derived from a subjective manual analysis of a subset of the documents; determine an error metric based on a measure of deviation between ideal purity metrics and the actual purity metrics; and/or adjust a parameter of the topic detection process according to the error metric resulting in an adjusted topic detection process.

In one or more embodiments, the communication system 600 can include a super head-end office (SHO) 610 with at least one super headend office server (SHS) 611 which receives media content from satellite and/or terrestrial communication systems. In the present context, media content can represent, for example, audio content, moving image content such as 2D or 3D videos, video games, virtual reality content, still image content, and combinations thereof. The SHS server 611 can forward packets associated with the media content to one or more video head-end servers (VHS) 614 via a network of video head-end offices (VHO) 612 according to a multicast communication protocol. The VHS 614 can distribute multimedia broadcast content via an access network 618 to commercial and/or residential buildings 602 housing a gateway 604 (such as a residential or commercial gateway).

The access network 618 can represent a group of digital subscriber line access multiplexers (DSLAMs) located in a central office or a service area interface that provide broadband services over fiber optical links or copper twisted pairs 619 to buildings 602. The gateway 604 can use communication technology to distribute broadcast signals to media processors 606 such as Set-Top Boxes (STBs) which in turn present broadcast channels to media devices 608 such as computers or television sets managed in some instances by a media controller 607 (such as an infrared or RF remote controller).

The gateway 604, the media processors 606, and media devices 608 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. By way of these interfaces, unicast communications can also be invoked between the media processors 606 and subsystems of the IPTV media system for services such as video-on-demand (VoD), browsing an electronic programming guide (EPG), or other infrastructure services.

A satellite broadcast television system 629 can be used in the media system of FIG. 6. The satellite broadcast television system can be overlaid, operably coupled with, or replace the IPTV system as another representative embodiment of communication system 600. In this embodiment, signals transmitted by a satellite 615 that include media content can be received by a satellite dish receiver 631 coupled to the building 602. Modulated signals received by the satellite dish receiver 631 can be transferred to the media processors 606 for demodulating, decoding, encoding, and/or distributing broadcast channels to the media devices 608. The media processors 606 can be equipped with a broadband port to an Internet Service Provider (ISP) network 632 to enable interactive services such as VoD and EPG as described above.

In yet another embodiment, an analog or digital cable broadcast distribution system such as cable TV system 633 can be overlaid, operably coupled with, or replace the IPTV system and/or the satellite TV system as another representative embodiment of communication system 600. In this embodiment, the cable TV system 633 can also provide Internet, telephony, and interactive media services. System 600 enables various types of interactive television and/or services including IPTV, cable and/or satellite.

The subject disclosure can apply to other present or next generation over-the-air and/or landline media content services system.

Some of the network elements of the IPTV media system can be coupled to one or more computing devices 630, a portion of which can operate as a web server for providing web portal services over the ISP network 632 to wireline media devices 608 or wireless communication devices 616.

Communication system 600 can also provide for all or a portion of the computing devices 630 to function as a topic detection server (herein referred to as server 630). The server 630 can use computing and communication technology to perform function 675, which can include one or more features described in function 175 of FIG. 1, and which can include among other things, pre-processing raw documents (or other data sets); obtaining manually generated topics and corresponding words for a small sample of the raw documents resulting in manual topic/words; applying a topic detection algorithm to the filtered documents resulting in TD current topics/words; comparing the TD current topics/words with the manual topic/words to determine a measure of purity or mutual exclusivity resulting in an actual purity metric; deriving an error metric based on the actual purity metric and an ideal purity metric; adjusting a parameter(s) of the particular topic detection algorithm according to the error metric (e.g., utilizing stochastic gradient descent optimization); repeating one or more of the above steps a desired number of times to obtain adjusted or optimized topics/words describing the raw documents. In one or more embodiments, the comparison of the TD current topics/words with manual topic/words to determine the measure of purity or mutual exclusivity does not need to be based on exact matches, but instead can be based on similarities between the topics/words or similarities between characteristics of the topics/words. For instance, function 675 of server 630 can be similar to the functions described for server 130 of FIG. 1 in accordance with method 500. In one or more embodiments, the media processors 606 and wireless communication devices 616 can be sources of the documents or can otherwise contribute to the generating of the documents, such as based on a communication session.

Multiple forms of media services can be offered to media devices over landline technologies such as those described above. Additionally, media services can be offered to media devices by way of a wireless access base station 617 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 7:
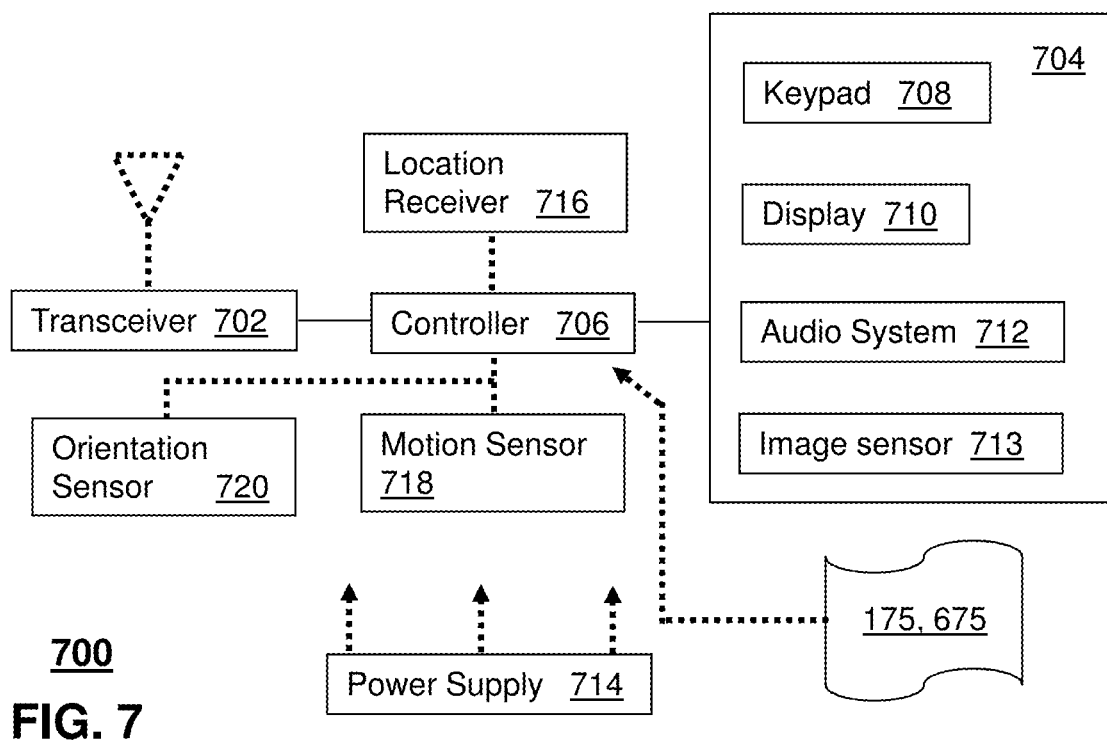
FIG. 7 depicts an illustrative embodiment of a communication device that can perform topic detection of data and adjustment of a topic detection process.

FIG. 7 depicts an illustrative embodiment of a communication device 700. Communication device 700 can serve in whole or in part as an illustrative embodiment of the devices depicted in FIGS. 1 and 6, and can be configured to perform portions of method 500 of FIG. 5. As an example, communication device 700 can apply a topic detection process to documents to obtain automatically detected topics and groups of automatically detected words that each correspond to one of the automatically detected topics, where the automatically detected topics are characterized by probability distributions over a set of words associated with the documents; compare each of the automatically detected topics with manually determined topics according to similarities associated with the groups of automatically detected words and groups of manually determined words of the manually determined topics to determine actual purity metrics, where the manually determined topics and the groups of manually determined words are derived from a manual analysis of a subset of the documents; determine an error metric based on a measure of deviation between ideal purity metrics and the actual purity metrics; and/or adjust a parameter of the topic detection process according to the error metric resulting in an adjusted topic detection process.

Communication device 700 can comprise a wireline and/or wireless transceiver 702 (herein transceiver 702), a user interface (UI) 704, a power supply 714, a location receiver 716, a motion sensor 718, an orientation sensor 720, and a controller 706 for managing operations thereof. The transceiver 702 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 702 can also be adapted to support circuit-switched wireline access technologies (such as PSTN), packet-switched wireline access technologies (such as TCP/IP, VoIP, etc.), and combinations thereof.

The UI 704 can include a depressible or touch-sensitive keypad 708 with a navigation mechanism such as a roller ball, a joystick, a mouse, or a navigation disk for manipulating operations of the communication device 700. The keypad 708 can be an integral part of a housing assembly of the communication device 700 or an independent device operably coupled thereto by a tethered wireline interface (such as a USB cable) or a wireless interface supporting for example Bluetooth®. The keypad 708 can represent a numeric keypad commonly used by phones, and/or a QWERTY keypad with alphanumeric keys. The UI 704 can further include a display 710 such as monochrome or color LCD (Liquid Crystal Display), OLED (Organic Light Emitting Diode) or other suitable display technology for conveying images to an end user of the communication device 700. In an embodiment where the display 710 is touch-sensitive, a portion or all of the keypad 708 can be presented by way of the display 710 with navigation features.

The display 710 can use touch screen technology to also serve as a user interface for detecting user input. As a touch screen display, the communication device 700 can be adapted to present a user interface with graphical user interface (GUI) elements that can be selected by a user with a touch of a finger. The touch screen display 710 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 710 can be an integral part of the housing assembly of the communication device 700 or an independent device communicatively coupled thereto by a tethered wireline interface (such as a cable) or a wireless interface.

The UI 704 can also include an audio system 712 that utilizes audio technology for conveying low volume audio (such as audio heard in proximity of a human ear) and high volume audio (such as speakerphone for hands free operation). The audio system 712 can further include a microphone for receiving audible signals of an end user. The audio system 712 can also be used for voice recognition applications. The UI 704 can further include an image sensor 713 such as a charged coupled device (CCD) camera for capturing still or moving images.

The power supply 714 can utilize common power management technologies such as replaceable and rechargeable batteries, supply regulation technologies, and/or charging system technologies for supplying energy to the components of the communication device 700 to facilitate long-range or short-range portable applications. Alternatively, or in combination, the charging system can utilize external power sources such as DC power supplied over a physical interface such as a USB port or other suitable tethering technologies.

The location receiver 716 can utilize location technology such as a global positioning system (GPS) receiver capable of assisted GPS for identifying a location of the communication device 700 based on signals generated by a constellation of GPS satellites, which can be used for facilitating location services such as navigation. The motion sensor 718 can utilize motion sensing technology such as an accelerometer, a gyroscope, or other suitable motion sensing technology to detect motion of the communication device 700 in three-dimensional space. The orientation sensor 720 can utilize orientation sensing technology such as a magnetometer to detect the orientation of the communication device 700 (north, south, west, and east, as well as combined orientations in degrees, minutes, or other suitable orientation metrics).

The communication device 700 can use the transceiver 702 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 706 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 700.

Other components not shown in FIG. 7 can be used in one or more embodiments of the subject disclosure. For instance, the communication device 700 can include a reset button (not shown). The reset button can be used to reset the controller 706 of the communication device 700. In yet another embodiment, the communication device 700 can also include a factory default setting button positioned, for example, below a small hole in a housing assembly of the communication device 700 to force the communication device 700 to re-establish factory settings. In this embodiment, a user can use a protruding object such as a pen or paper clip tip to reach into the hole and depress the default setting button. The communication device 700 can also include a slot for adding or removing an identity module such as a Subscriber Identity Module (SIM) card. SIM cards can be used for identifying subscriber services, executing programs, storing subscriber data, and so forth.

The communication device 700 as described herein can operate with more or less of the circuit components shown in FIG. 7. These variant embodiments can be used in one or more embodiments of the subject disclosure.

The communication device 700 can be adapted to perform the functions of servers 130, 630, the media processor 606, the media devices 608, or the portable communication devices 616 of FIG. 6. It will be appreciated that the communication device 700 can also represent other devices that can operate in systems of FIGS. 1 and 6, such as a gaming console and a media player. In addition, the controller 706 can be adapted in various embodiments to perform the functions 175 and 675, respectively.

Upon reviewing the aforementioned embodiments, it would be evident to an artisan with ordinary skill in the art that said embodiments can be modified, reduced, or enhanced without departing from the scope of the claims described below. For example, iterations of the topic detection algorithm can vary, such as having different numbers of corresponding words, different numbers of topics, and so forth. In one embodiment, the number of words associated with a topic (manual and/or automated) can also vary within a single iteration or between iterations. In another embodiment, the manually examination can be implemented a single time or can be implemented multiple times over the iterations of the topic detection optimization process.

In one or more embodiments, the topic detection adjustment methodology described herein can be utilized for characterization of customer chat transcripts to identify the issue(s)/reason(s) for the customer's chat; whether or not the customer's issue or problem was resolved; how satisfactory and painless the customer chat experience was, and aggregate chat statistics like frequencies of various issues.

In one or more embodiments, the topic detection adjustment methodology described herein can improve a computer's functionality and/or efficiency. For example, the topic detection adjustment methodology described herein can be an improvement over supervised learning techniques which require an expensive and time-consuming manual labeling process and with crowd-sourcing of labeling not always feasible due to data privacy issues; where a pre-determined set of topics may not cover the full range of issues present in the collection of documents; and which is not scalable or is not adaptable to new domains (e.g., chats related to a different product) without having to repeat the expensive manual-labeling effort.

One or more of the embodiments described herein can provide more accurate characterization of the issue(s) or reason(s) associated with particular documents, a reduction of development time for a characterization system due to reduced need for labeling and due to automated topic-detection with its hyper-parameter tuning, reduction in operating costs due to proper identification and targeting of the significant pain-point issues associated with the documents or sources of the documents, and/or improved user experience (for user based documents) as a result of target resource allocation to more relevant detected issues. In one or more embodiments, the data or documents may or may not be associated with communication services.

One or more embodiments provide topic-detection algorithm(s) that are adjusted or optimized to the particular domain and/or optimized for mutual-exclusivity of topics. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 8:
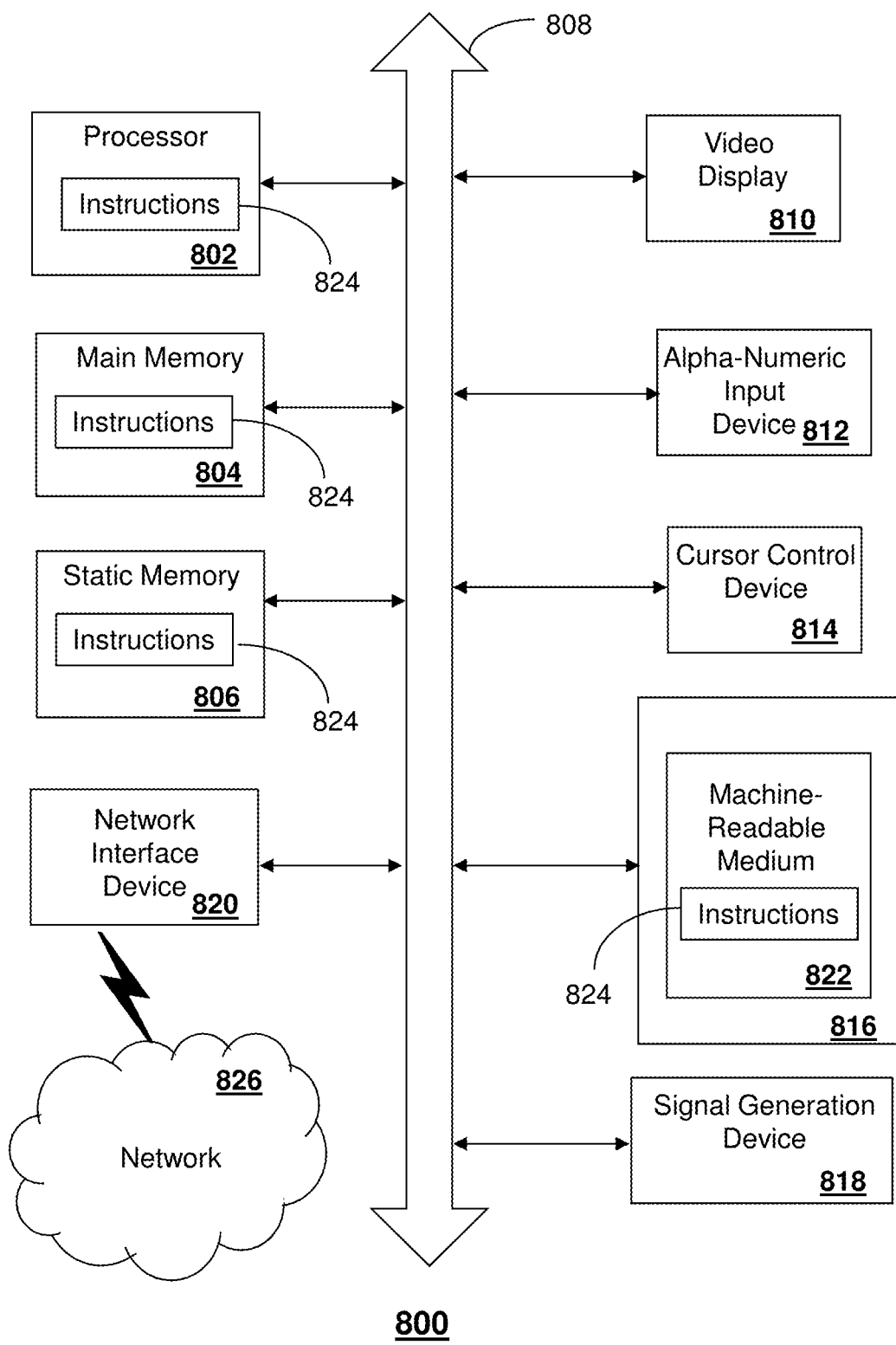
FIG. 8 is a diagrammatic representation of a machine in the form of a computer system within which a set of instructions, when executed, may cause the machine to perform any one or more of the methods described herein.

FIG. 8 depicts an exemplary diagrammatic representation of a machine in the form of a computer system 800 within which a set of instructions, when executed, may cause the machine to perform any one or more of the methods described above. One or more instances of the machine can operate, for example, as the server 130, 430 and other devices described herein. As an example, the machine can perform an optimization technique that can be utilized to train different topic detection algorithms so that the topic detection algorithm is adjusted/optimized according to an error metric derived from purity metrics. In some embodiments, the machine may be connected (e.g., using a network 826) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 800 may include a processor (or controller) 802 (e.g., a central processing unit (CPU)), a graphics processing unit (GPU, or both), a main memory 804 and a static memory 806, which communicate with each other via a bus 808. The computer system 800 may further include a display unit 810 (e.g., a liquid crystal display (LCD), a flat panel, or a solid state display). The computer system 800 may include an input device 812 (e.g., a keyboard), a cursor control device 814 (e.g., a mouse), a disk drive unit 816, a signal generation device 818 (e.g., a speaker or remote control) and a network interface device 820. In distributed environments, the embodiments described in the subject disclosure can be adapted to utilize multiple display units 810 controlled by two or more computer systems 800. In this configuration, presentations described by the subject disclosure may in part be shown in a first of the display units 810, while the remaining portion is presented in a second of the display units 810.

The disk drive unit 816 may include a tangible computer-readable storage medium 822 on which is stored one or more sets of instructions (e.g., software 824) embodying any one or more of the methods or functions described herein, including those methods illustrated above. The instructions 824 may also reside, completely or at least partially, within the main memory 804, the static memory 806, and/or within the processor 802 during execution thereof by the computer system 800. The main memory 804 and the processor 802 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. Distributed processing environments can include multiple processors in a single machine, single processors in multiple machines, and/or multiple processors in multiple machines. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 822 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 800. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, comprising:

applying, by a processing system including a processor, a topic detection process to documents to obtain automatically detected topics and groups of automatically detected words that each correspond to one of the automatically detected topics, wherein the automatically detected topics are characterized by probability distributions over a set of words associated with the documents, and wherein each of the automatically detected words is in at least one of the documents;

obtaining, by the processing system, manually determined topics and groups of manually determined words that each correspond to one of the manually determined topics, wherein the manually determined topics and the groups of manually determined words are derived from a manual analysis of a subset of the documents, wherein each of the manually determined topics characterizes at least one of the subset of the documents, and wherein each of the manually determined words is in at least one of the subset of the documents;

comparing, by the processing system, respective automatically detected words of the groups of automatically detected words of each of the automatically detected topics with respective manually determined words of the groups of manually determined words of manually determined topics according to similarities between the respective automatically detected words of the groups of automatically detected words and the respective manually determined words of the groups of manually determined words to determine actual purity metrics;

determining, by the processing system, an error metric based on a measure of deviation between ideal purity metrics and the actual purity metrics, wherein the ideal purity metrics are based on a determination as to whether an automatically detected topic is a new topic as compared to the manually determined topics;

adjusting, by the processing system, a parameter of the topic detection process to reduce the error metric resulting in an adjusted topic detection process; and applying, by the processing system, the adjusted topic detection process to the documents to obtain adjusted automatically detected topics and groups of adjusted automatically detected words that each correspond to one of the adjusted automatically detected topics.

2. The method of claim 1, wherein each of the actual purity metrics is determined by:

determining a first similarity quantity by quantifying a largest similarity between a first group of automatically detected words of one of the automatically detected topics and a first group of manually determined words of a most similar manually determined topic with respect to the one of the automatically detected topics;

determining a second similarity quantity by quantifying a second largest similarity between the first group of automatically detected words of the one of the automatically detected topics and a second group of manually determined words of a second most similar manually determined topic with respect to the one of the automatically detected topics; and calculating a differential between the first and second similarity quantities.

3. The method of claim 2, comprising filtering the documents prior to the applying the topic detection process, wherein the filtering removes particular words, HTML tags, email addresses, or a combination thereof.

4. The method of claim 1, comprising applying, by the processing system, the adjusted topic detection process to other documents, wherein at least one of the documents is characterized by more than one of the automatically detected topics.

5. The method of claim 1, wherein the adjusting the parameter of the topic detection process is based on stochastic gradient descent optimization.

6. The method of claim 1, wherein the topic detection process comprises a latent dirichlet allocation process.

7. The method of claim 1, wherein the measure of deviation comprises a mean squared deviation.

8. The method of claim 1, wherein each of the ideal purity metrics is defined as either a one or a zero, wherein a number of the manually determined topics is equal to a number of a first set of the ideal purity metrics that are defined as one, and wherein a difference between the number of the manually determined topics and a number of the automatically detected topics is equal to a number of a second set of the ideal purity metrics that are defined as zero.

9. A device, comprising:

a processing system including a processor; and a memory that stores executable instructions that, when executed by the processing system, facilitate performance of operations, comprising:

applying a topic detection process to documents to obtain automatically detected topics and groups of automatically detected words that each correspond to one of the automatically detected topics, wherein the automatically detected topics are characterized by probability distributions over a set of words associated with the documents, and wherein each of the automatically detected words is in at least one of the documents;

comparing respective automatically determined words of the groups of automatically detected words of each of the automatically detected topics with respective manually determined words of groups of manually determined words of manually determined topics according to similarities between the respective automatically determined words of the groups of automatically detected words and the respective manually determined words of the groups of manually determined words for all of the manually determined topics to determine actual purity metrics, wherein the manually determined topics and the groups of manually determined words are derived from a manual analysis of a subset of the documents, wherein each of the manually determined topics characterizes at least one of the subset of the documents, and wherein each of the manually determined words is in at least one of the subset of the documents;

determining an error metric based on a measure of deviation between ideal purity metrics and the actual purity metrics, wherein the ideal purity metrics are based on a determination as to whether an automatically detected topic is a new topic as compared to the manually determined topics; and adjusting a parameter of the topic detection process to reduce the error metric resulting in an adjusted topic detection process.

10. The device of claim 9, wherein the operations further comprise:

applying the adjusted topic detection process to the documents to obtain adjusted automatically detected topics and groups of adjusted automatically detected words that each correspond to one of the adjusted automatically detected topics.

11. The device of claim 9, wherein each of the actual purity metrics is determined by:

determining a first similarity quantity by quantifying a largest similarity between one of the automatically detected topics and a most similar manually determined topic with respect to the one of the automatically detected topics;

determining a second similarity quantity by quantifying a second largest similarity between the one of the automatically detected topics and a second most similar manually determined topic with respect to the one of the automatically detected topics; and calculating a differential between the first and second similarity quantities.

12. The device of claim 9, wherein the ideal purity metrics are defined as either one or zero.

13. The device of claim 9, wherein the operations further comprise filtering the documents prior to the applying the topic detection process, wherein the filtering removes particular words, HTML tags, email addresses, or a combination thereof.

14. The device of claim 9, wherein the operations further comprise applying the adjusted topic detection process to other documents.

15. The device of claim 9, wherein the adjusting the parameter of the topic detection process is based on stochastic gradient descent optimization, and wherein the topic detection process comprises a latent dirichlet allocation process.

16. A non-transitory, machine-readable storage medium, comprising executable instructions that, when executed by a processing system including a processor, facilitate performance of operations, comprising:

applying a topic detection process to documents to obtain automatically detected topics and groups of automatically detected words that each correspond to one of the automatically detected topics, wherein the automatically detected topics are characterized by probability distributions over a set of words associated with the documents;

comparing, respective automatically detected words of the groups of automatically detected words of each of the automatically detected topics with respective manually determined words of groups of manually determined words of manually determined topics according to similarities associated with the respective automatically detected words of the groups of automatically detected words and the respective manually determined words of the groups of manually determined words of the manually determined topics to determine actual purity metrics, wherein the manually determined topics and the groups of manually determined words are derived from a manual analysis of a subset of the documents, wherein each of the manually determined topics characterizes at least one of the subset of the documents, and wherein each of the manually determined words is in at least one of the subset of the documents;

determining an error metric based on a measure of deviation between ideal purity metrics and the actual purity metrics, wherein the ideal purity metrics are based on a determination as to whether an automatically detected topic is a new topic as compared to the manually determined topics; and adjusting a parameter of the topic detection process to reduce the error metric resulting in an adjusted topic detection process.

17. The non-transitory, machine-readable storage medium of claim 16, wherein each of the actual purity metrics is determined by:

determining a first similarity quantity by quantifying a largest similarity between one of the automatically detected topics and a most similar manually determined topic with respect to the one of the automatically detected topics;

determining a second similarity quantity by quantifying a second largest similarity between the one of the automatically detected topics and a second most similar manually determined topic with respect to the one of the automatically detected topics; and calculating a differential between the first and second similarity quantities.

18. The non-transitory, machine-readable storage medium of claim 16, wherein the operations further comprise:

applying the adjusted topic detection process to the documents to obtain adjusted automatically detected topics and groups of adjusted automatically detected words that each correspond to one of the adjusted automatically detected topics.

19. The non-transitory, machine-readable storage medium of claim 16, wherein the ideal purity metrics are defined as either one or zero.

20. The non-transitory, machine-readable storage medium of claim 16, wherein the operations further comprise filtering the documents prior to the applying the topic detection process, wherein the filtering removes particular words, HTML tags, email addresses, or a combination thereof.

* * * * *